A. R. MARLEY & E. H. LITTLE.
PROCESS OF PREPARING KILLED FOWLS FOR FOOD.
APPLICATION FILED JULY 27, 1905.
1,011,131.
Patented Dec. 5, 1911.
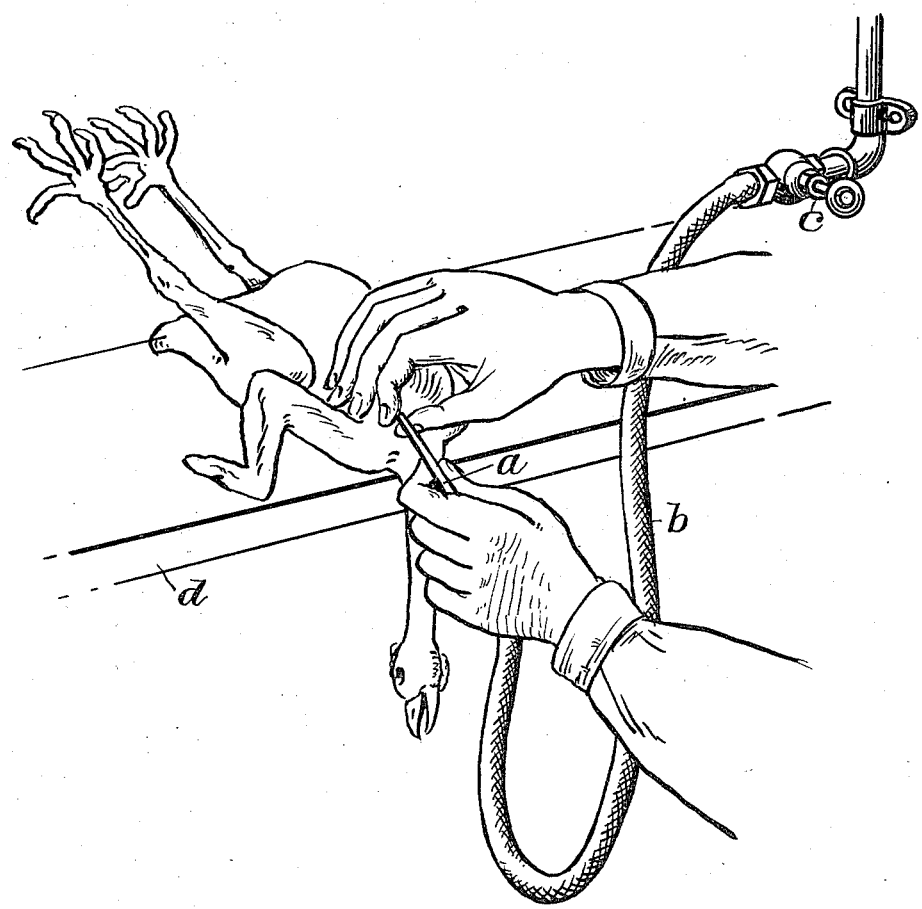
Witnesses:
L. B. Worner
F. C. Dynes.
Inventors
Albe R. Marley and
Emery H. Little.
By Minturn & Worner,
Attorneys.

UNITED STATES PATENT OFFICE.

ALBE R. MARLEY, OF CLAYTON, AND EMERY H. LITTLE, OF GREENCASTLE, INDIANA, ASSIGNORS OF ONE-HALF TO JOSEPH A. MINTURN AND FRANK W. WOERNER, OF INDIANAPOLIS, INDIANA.

PROCESS OF PREPARING KILLED FOWLS FOR FOOD.

1,011,131.      Specification of Letters Patent.      Patented Dec. 5, 1911.

Application filed July 27, 1905. Serial No. 271,536.

*To all whom it may concern:*

Be it known that we, ALBE R. MARLEY, residing at Clayton, in the county of Hendricks and State of Indiana, a citizen of the United States, and EMERY H. LITTLE, a citizen of the United States, residing at Greencastle, in the county of Putnam and State of Indiana, have invented certain new and useful Improvements in Processes of Preparing Killed Fowls for Food, of which the following is a specification.

This invention relates to a process for dressing fowls and animals for food purposes, and the object, primarily, is to render the meat more tender, juicy, and palatable than obtained by methods heretofore practiced.

While this invention is shown and described for the dressing of poultry, it is applicable to the dressing of animals as well, and it is not desired to limit the invention to the preparation of fowls for food.

It is well known that the English method of killing poultry is to cause death by breaking the neck of the fowl without making any incision to permit of bleeding. It is claimed for this practice that the flesh absorbs the water element of the blood, thereby making the meat more tender, sweet and juicy than when the blood is removed.

People are heard to comment daily on the unexpected dryness and toughness of chickens and other fowls sold to them as young birds, and they are perhaps not aware that this unsatisfactory condition is due to a very large degree to the drainage of much of the liquid element, by improper killing and handling that should be left in the body of the dressed fowl to give the proper flavor and relish thereto.

The English practice, referred to above, of retaining the blood, is too offensive to the American mind to be countenanced, and the object of this invention is to provide means, not only for restoring the liquid losses, but to increase the amount over the natural quantity, and thereby proportionately add to the delicacy of the product.

The accompanying drawing is a view in perspective illustrating the introduction of the injecting needle of this process into a fowl which has been killed and picked.

The invention is based on the discovery, that by injecting water into the undrawn cavity of the body externally of the intestines, before the animal heat has departed therefrom after killing, and without breaking the skin other than for the introduction of the injecting tube or needle, by some natural process which seems to be an osmose one, the whole muscular fiber and all of the tissues of the body begin to absorb the moisture. In the course of from four to eight hours the usual time being six hours a four-pound dressed chicken—that is, one which is unopened, or which has not been disemboweled—will have completely absorbed approximately one-half pint of water, or between eight and nine per cent. of its weight, of water. The quantity of water that will be taken up in this way depends of course on the size of the fowl, and also upon its condition. A fat one will absorb a greater percentage of water than one in a lean condition. The temperature of the injected water should be between 60° F. and 70° F. to secure the best results.

In practice, a long stiff hollow tube or needle preferably of metal is used, which, immediately after the fowl is killed and picked, and before the animal heat has left it, is inserted through the esophagus, to and through and past the crop, and then the desired quantity of water is injected by pressure from an elevated supply, or by a force pump or other suitable means, through said hollow needle. The needle has an exit at or adjacent to its inserted end. Instead of through the esophagus, the needle may be introduced through the thin membrane at the side of the base of the neck, adjacent to where incisions are commonly made for the purpose of removing the contents of the crop as shown in the drawing, in which *a* represents the needle, *b* the tube supplying water thereto, *c* a valve for regulating the water supply, and *d* the operating table or bench. After the injection has been made the bodies of the fowls, then at a temperature of about 90° F. will be gradually cooled during a period of from four to eight hours, the usual time being about six hours, so that at the end of the period the temperature will be approximately 65° F. To avoid injurious chilling the cooling temperature should not go below 40° F. at any time. Dry picked poultry, that is, killed fowls which have their feathers removed without a preliminary scalding, are preferably hung up by the feet during this time of absorption, in a room maintained at the above temperature, but with fowls that have been scalded preliminary to picking and that are afterward preserved in an ice-pack, the practice is to throw them with others into a barrel of water after the injection, there to remain during the above period of absorption.

It is found on cutting open fowls that have been treated as above described, that there is no unabsorbed water, and no more apparent moisture than would be present under natural conditions; but on cooking and eating, it will be found that the meat is more juicy and palatable, sweeter and tenderer, than if prepared by the methods heretofore in vogue.

The absorption of the injected liquid will be accelerated by electrical action, by placing the body between suitable electrodes, as is sometimes done by physicians and surgeons to accelerate the absorption of externally applied medicines.

Having thus fully described the invention, what is claimed as new and desired to be secured by Letters Patent, is—

1. The process of preparing killed fowls and animals for food, which consists in forming an opening to and injecting water into the undrawn cavity of the body before the animal heat has left the latter after killing.

2. The process of preparing killed fowls and animals for food, which consists in forming an opening to and injecting water into the cavity of the body before the animal heat has left the latter after killing, and keeping the body thus injected, for one or more hours thereafter, in a temperature of at least 40° F.

3. The process of preparing killed fowls and animals for food, which consists in forming an opening to and injecting water into the cavity of the body before the animal heat has left the body after killing, and keeping the body thus injected, for one or more hours thereafter, in a temperature averaging 60° F.

4. The process of preparing killed fowls and animals for food, which consists in forming an opening to and injecting approximately eight per cent. of its weight of water into the cavity of the body before the animal heat has left the body after killing.

5. The process of preparing killed fowls and animals for food, which consists in forming an opening to and injecting approximately eight per cent. of its weight of water of a temperature between 50° F. and 70° F. into the cavity of the body before the animal heat has left the body after killing, and keeping the body thus injected for one or more hours thereafter in a temperature of at least 40° F.

6. The process of preparing killed fowls and animals for food, which consists in forming an opening to and injecting approximately eight per cent. of its weight of water into the unopened cavity of the body, before the animal heat has left the latter after killing, and keeping the body thus injected for approximately six hours thereafter in a temperature of about 60° F.

7. The process of preparing killed fowls and animals for food, which consists in forming an opening to and injecting water into the unopened cavity of the body while the latter is still warm with animal heat.

8. The process of preparing killed fowls and animals for food, which consists in forming an opening to and injecting water into the unopened cavity of the body while the latter is still warm with animal heat, and then placing the body between electrodes in an electric circuit.

In witness whereof, we have hereunto set our hands and seals at Indianapolis, Indiana, this 17th day of July, A. D. one thousand nine hundred and five.

ALBE R. MARLEY. [L. S.]
EMERY H. LITTLE. [L. S.]

Witnesses:
F. W. WOERNER,
J. A. MINTURN.

Copies of this patent may be obtained for five cents each, by addressing the "Commissioner of Patents, Washington, D. C."